United States Patent [19]

Ihle

[11] Patent Number: 4,605,903
[45] Date of Patent: Aug. 12, 1986

[54] FSK DEMODULATOR WITH HIGH NOISE IMMUNITY DIGITAL PHASE DETECTOR

[75] Inventor: John M. Ihle, Lake Worth, Fla.
[73] Assignee: Motorola, Inc., Schaumburg, Ill.
[21] Appl. No.: 795,941
[22] Filed: Nov. 7, 1985
[51] Int. Cl.⁴ ............................................. H03D 3/18
[52] U.S. Cl. ..................................... 329/50; 329/124; 375/80
[58] Field of Search ................. 329/50, 107, 122, 124; 375/45, 80, 88, 94

[56] References Cited

U.S. PATENT DOCUMENTS

| | | | |
|---|---|---|---|
| 3,609,555 | 8/1971 | Van Berkom | 329/126 X |
| 3,746,995 | 7/1973 | Schroeder et al. | 329/126 X |
| 3,758,870 | 8/1973 | Schmitt et al. | 329/122 X |
| 3,813,604 | 5/1974 | Denoncourt | 329/122 |
| 3,956,623 | 5/1976 | Clark et al. | 235/186 |
| 4,021,743 | 5/1977 | Claxton | 329/122 X |
| 4,051,440 | 8/1977 | Nelson et al. | 329/122 X |
| 4,057,762 | 10/1977 | Namiki | 329/50 |
| 4,068,174 | 1/1978 | Svelund | 325/325 |
| 4,090,145 | 5/1978 | Webb | 329/50 X |
| 4,322,851 | 3/1982 | Vance | 375/88 |
| 4,338,579 | 7/1982 | Rhodes | 329/105 X |
| 4,501,002 | 2/1985 | Auchterlonie | 375/86 |
| 4,506,228 | 3/1985 | Kammeyer | 329/107 |

FOREIGN PATENT DOCUMENTS 1517121 7/1978 United Kingdom .

OTHER PUBLICATIONS

I. A. W. Vance; "Fully Integrated Radio Paging Receiver"; Feb. 1982; *IEE Proc.*, vol. 129, Pt. F, No. 1, Feb. 1982.

Primary Examiner—Eugene R. LaRoche
Assistant Examiner—D. C. Mis
Attorney, Agent, or Firm—Martin J. McKinley; Joseph T. Downey; Edward M. Roney

[57] ABSTRACT

A receiver for receiving and demodulating FSK modulated data signals has improved sensitivity over substantial frequency offsets between the transmitter and receiver local oscillator, and low spurious electromagnetic radiation. A quadrature coupler splits the received signal into in-phase and quadrature phase signals which are then mixed down to baseband, filtered, and limited. An RC circuit at the output of a four flip flop demodulator averages the flip flop output signals. A voltage comparator outputs a logical 1 if the voltage at the output of the RC averaging circuit is greater than one-half the supply voltage; otherwise the comparator outputs a logical zero.

7 Claims, 3 Drawing Figures

4,605,903

FSK DEMODULATOR WITH HIGH NOISE IMMUNITY DIGITAL PHASE DETECTOR

BACKGROUND OF THE INVENTION

Certain receiver designs have been developed to receive and demodulate a binary data signal which is modulated on a radio frequency carrier by frequency shift keying ("FSK") modulation. One such prior art receiver is illustrated in FIG. 1. In the prior art receiver, the frequency of a local oscillator 100 is set equal to the received carrier frequency. A radio frequency carrier, FSK modulated with a data signal, is picked up by an antenna 102 and mixed with the local oscillator output in mixers 104 and 106. The output of mixer 106 is an in-phase baseband signal, however, the output of mixer 104 is a quadrature phase baseband signal because the local oscillator output is phase shifted 90 degrees by a phase shift network 108 before being injected into mixer 104. The in-phase and quadrature phase baseband signals are filtered respectively by low pass filters 110 and 112. After limiting, binary in-phase and binary quadrature phase baseband signals appear respectively at the outputs of limiters 114 and 116. Each binary baseband signal is then clocked on both leading and trailing edges of the other binary baseband signal by flip flops 118, 120, 124, and 126. NOR gates 130, 132, 134, and 136 form a combinational logic circuit that is used to set and reset S-R latches 138 and 140 based on particular combinations of the flip flop output states. The outputs of S-R latches 138 and 140 are then combined by resistors 142 and 146 to produce an output signal at output 144. If both outputs of S-R latches are high, a logical 1 is indicated at output 144. If both outputs of S-R latches 138 and 140 are low, a logical 0 is indicated at output 144. If one S-R latch output is high and the other output is low, output 144 is in some undefined state.

One disadvantage of the prior art circuit is that a half amplitude error can occur at output 144 when a weak signal is received and noise is introduced into the receiver. A slight frequency offset between the transmitter frequency and the frequency of receiver local oscillator 106 can compound the problem. Typical transmitter and local oscillator stabilities are respectively +/−5 and +/−15 ppm. This results in a transmitter/local oscillator frequency offset of +/−20 ppm which translates to an absolute offset of +/−3 KHz for a 150 MHz transmitter carrier frequency. Measurements indicate that at 4 KHz deviation and at a transmitter/local oscillator offset of 2.5 KHz, the performance of the prior art circuit degrades by 8 dB from its performance at zero offset. When the deviation is reduced to 3 KHz, the prior art circuit is incapable of detecting data at 2.5 KHz offset.

Another disadvantage of the prior art circuit is found in phase shift network 108. Phase shift networks typically include coils which are well known radiators of spurious electromagnetic radiation. To prevent such spurious radiation, it is advantageous to keep the signal strength at the input of such a device as low as possible. In the prior art circuit, however, phase shift network 108 is connected to the output of local oscillator 106 which generates a very strong signal, typically −10 dBM. If some of the local oscillator's signal is radiated, other receivers in close proximity to the prior art circuit can be desensitized.

SUMMARY OF THE INVENTION

An object of the invention is to provide an improved data receiver.

Another object of the invention is to provide a receiver that reduces spurious radiation of the local oscillator signal.

A more specific object of the invention is to provide a receiver that has improved sensitivity at low signal strength and at substantial transmitter/local oscillator frequency offsets.

Briefly, the invention includes a detector for use with a quadrature generator means that generates binary in-phase and binary quadrature phase signals. A first flip flop clocks the quadrature phase signal on the leading edge of the in-phase signal. A second flip flop clocks the in-phase signal on the leading edge of the quadrature phase signal. A third flip flop clocks the quadrature phase signal on the trailing edge of the in-phase signal. A fourth flip flop clocks the in-phase signal on the trailing edge on the quadrature phase signal. The output signals of the four flip flops are averaged by an averaging means connected to the four flip flops.

In another embodiment, the invention includes a receiver for detecting a received signal. A quadrature generator means generates binary in-phase and binary quadrature phase signals respectively at in-phase and quadrature phase outputs. A first and a second flip flop each have an input connected to the in-phase output and each have an clock input connected to the quadrature phase output. The first flip flop is leading edge triggered and the second flip flop is trailing edge triggered. A third and a fourth flip flop each have an input connected to the quadrature phase output and each have a clock input connected to the in-phase output. The third flip flop is leading edge triggered and the fourth flip flop is trailing edge triggered. Four resistors each have one terminal respectively connected to an output of the four flip flops. The second terminals of the resistors are mutually connected. A capacitor is connected to the mutually connected terminals of the resistors.

In another embodiment, the invention includes a receiver for detecting a received signal. Included are two mixers, two filters, two limiters, and one quadrature coupler. The in-phase output of the quadrature coupler is connected to the first mixer while the quadrature phase output is connected to the second mixer. A first leading edge triggered D flip flop and a second trailing edge triggered D flip flop each have their D inputs connected to the first limiter and each have a clock input connected to the second limiter. A third leading edge triggered D flip flop and a fourth trailing edge triggered D flip flop each have a D input connected to the second limiter and each have a clock input connected to the first limiter. A capacitor is connected to an input of a voltage comparator. First, second, third and fourth resistors each have one terminal respectively connected to the Q-NOT output of the first D flip flop, the Q output of the second flip flop, the Q output of the third flip flop, and the Q-NOT output of the fourth flip flop. The second terminals of the four resistors are all connected to the input of the voltage comparator.

DESCRIPTION OF THE PREFERRED EMBODIMENT

Figure 2:
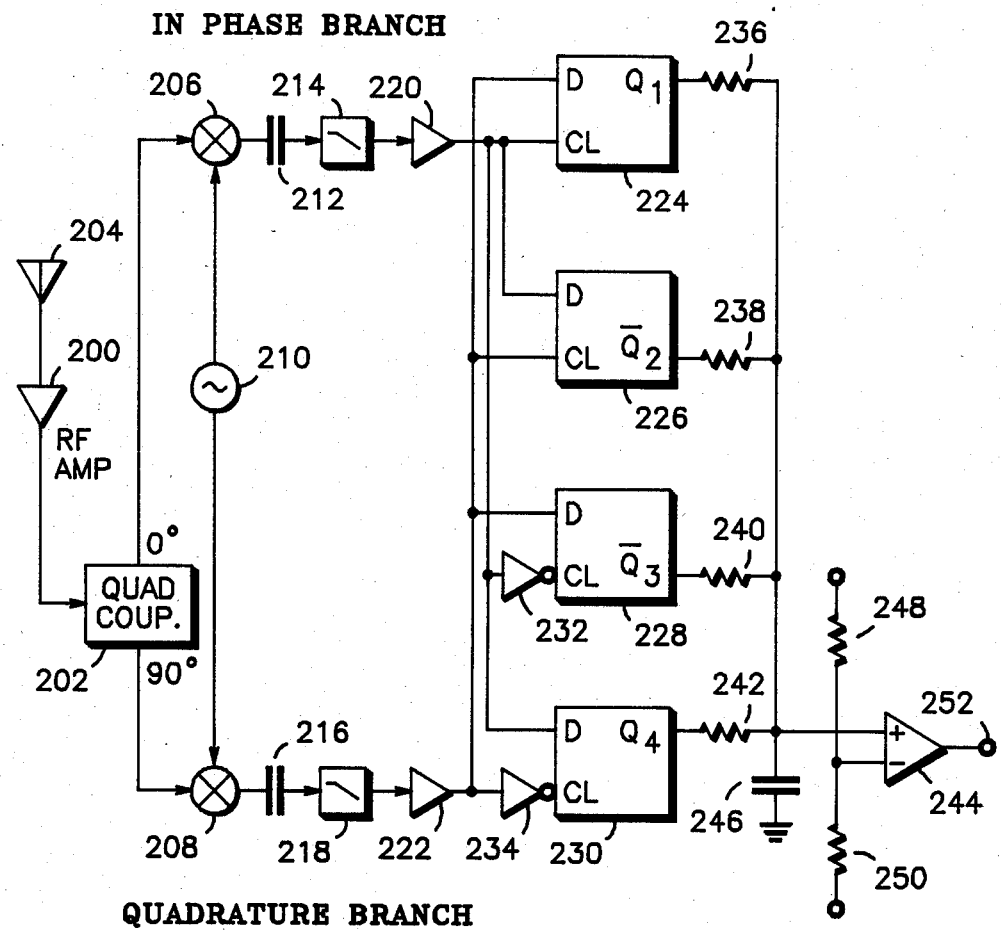
FIG. 2 is a diagram of the preferred embodiment of the receiver circuit of the present invention.

Referring to FIG. 2, an RF amplifier, preferably as cascode amplifier with 21 dB of gain and a 1.5 dB noise figure, is connected between a well known quadrature coupler 202 and an antenna 204. One input of each mixer 206 and 208 is respectively connected to the in-phase output and the quadrature phase output of quadrature coupler 202. Mixers 206 and 208 are preferably two quadrant differential amplifier type mixers. The output of a local oscillator 210, preferably a Colpitts crystal controlled oscillator, is connected to each second input of mixers 206 and 208. A capacitor 212 is connected between the input of a low pass filter 214 and the output of mixer 206. In a similar manner, a capacitor 216 is connected between the input of a low pass filter 218 and the output of mixer 208. Capacitors 212 and 216 have a preferred value of 0.1 micro-Farads. Low pass filters 214 and 218 are preferably six pole filters with a 6.5 KHz upper corner frequency. Capacitors 212 and 216 cause low pass filters 214 and 218 to have an overall band pass response with a lower corner frequency at about 1.5 KHz. Limiters 220 and 222 are respectively connected to the outputs of low pass filters 214 and 218. An in-phase binary baseband signal appears at the output of limiter 220 while a quadrature phase binary baseband signal appears at the output of limiter 222. Each limiter, 220 and 222, is preferably constructed from four cascaded 30 dB gain amplifier stages wherein each stage preferably uses a Motorola MC3403 operational amplifier. Thus, each limiter 220 and 222 has an over all gain of 120 dB.

Four D flip flops 224, 226, 228, and 230, preferably two Motorola MC14013 CMOS dual D flip flops, are connected to the outputs of limiters 220 and 222 as follows: The D inputs of flip flops 226 and 230, and the clock input of flip flop 224 are connected to the output of limiter 220. The D inputs of flip flops 224 and 228, and the clock input of flip flop 226 are connected to the output of limiter 222. An inverter 232 is connected between the clock input of flip flop 228 and the output of limiter 220. An inverter 234 is connected between the clock input of flip flop 230 and the output of limiter 222. Inverters 232 and 234 essentially convert flip flops 228 and 230 from leading edge triggered to trailing edge triggered flip flops. Inverters 232 and 234 are preferably one-third of a Motorola MC14069 CMOS hex inverter.

One terminal of each of four resistors 236, 238, 240, and 242, each having a preferred value of 10 K-Ohms, is connected to the non-inverting input of operational amplifier 244, while the other terminals are respectively connected to the Q output of flip flop 224, the Q-NOT output of flip flop 226, the Q-NOT output of flip flop 228, and the Q output of flip flop 230. A capacitor 246, having a preferred value of 0.01 micro-Farads, is connected between the non-inverting input of amplifier 244 and ground. Two serially connected resistors 248 and 250, preferably of equal value, are connected between a source of positive voltage and ground. The junction of resistors 248 and 250 is connected to the inverting input of amplifier 244. A demodulated data signal appears at an output 252 of amplifier 244.

Figure 3:
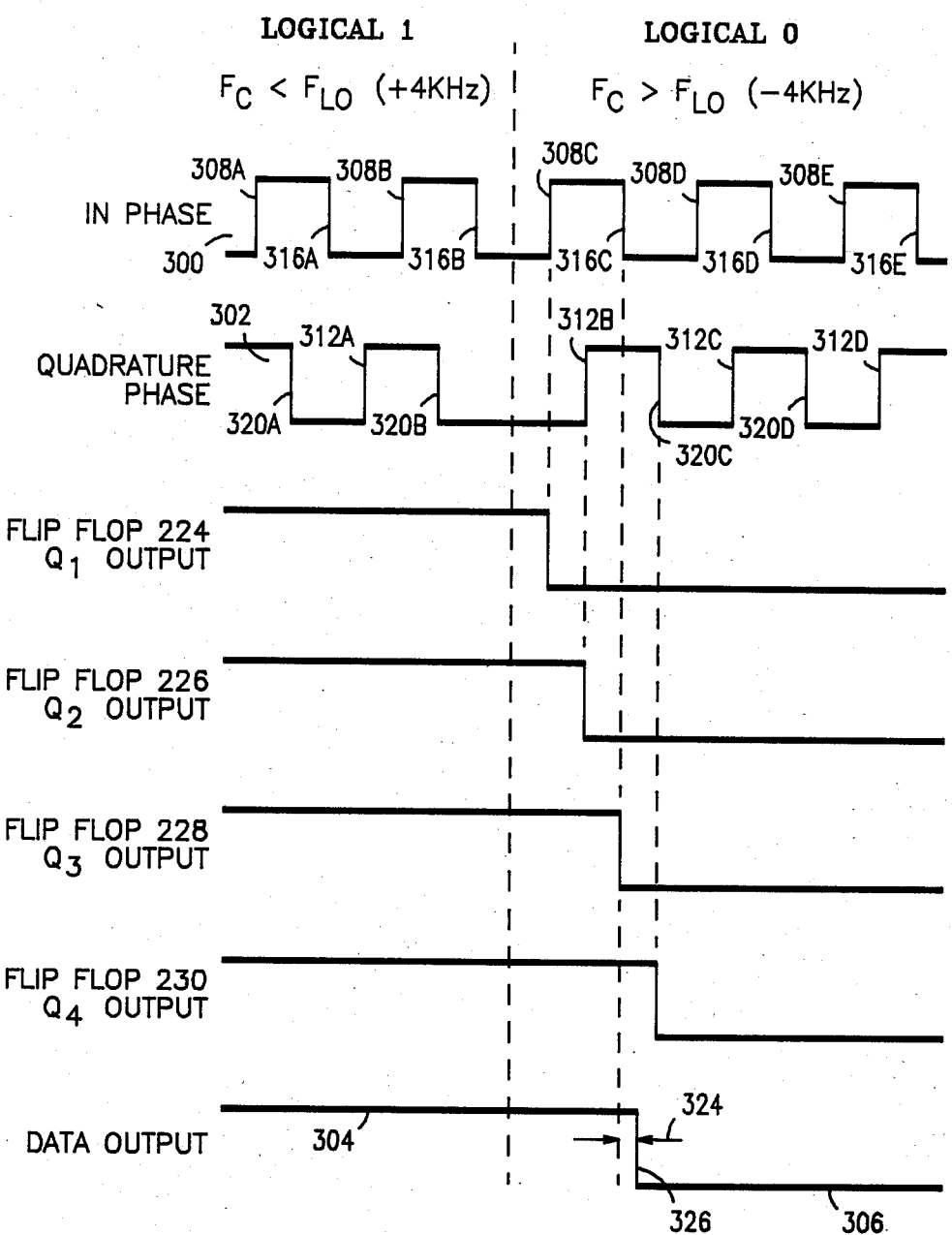
FIG. 3 is a timing diagram illustrating the operation of the receiver circuit of FIG. 2.

The operation of the receiver circuit of FIG. 2 can be understood by referring to FIG. 2 and to the timing diagram of FIG. 3. A received RF carrier, preferably modulated with a 600 baud data signal at $+/-4$ KHz deviation, is transmitted to the receiver and picked up by antenna 204. After amplification, the received signal is split by quadrature coupler 202 into an in-phase signal and a quadrature phase signal. The in-phase signal and the quadrature phase signal are then mixed with the local oscillator signal, which operates at the carrier frequency, to produce an in-phase baseband signal and a quadrature phase baseband signal respectively at the outputs of mixers 206 and 208. The in-phase baseband signal and the quadrature phase base band signal are then filtered respectively by filters 214 and 218 and limited respectively by limiters 220 and 222. Thus, a binary in-phase baseband signal 300 appears at the output of limiter 220 while a binary quadrature phase baseband signal 302 appears at the output of limiter 222.

FIG. 3 illustrates how output 252 of the receiver circuit of FIG. 2 changes from a logical 1 (304) to a logical 0 (306) when a logical 1 (+4 KHz deviation) is received followed by a logical 0 (−4 KHz deviation). By an examination of binary baseband signals 300 and 302, it will be noted that when a logical 1 is transmitted the binary quadrature phase signal 302 leads the binary in-phase signal 300 by 90 degrees. When a logical 0 is transmitted, however, the binary quadrature phase signal 302 lags the binary in-phase signal 300 by 90 degrees.

Flip flop 224 is clocked on the leading edges 308a–308e of binary in-phase baseband signal 300. Therefore, the Q output of flip flop 224 will be high at edges 308a and 308b, but at edge 308c the Q output will go low and remain low at edges 308d and 308e. Flip flop 226 is clocked on the leading edges 312a–312d of the binary quadrature phase baseband signal 302. Therefore, the Q-NOT output of flip flop 226 will be high at edge 312a, but will go low at edge 312b and remain low at edges 312c–312d. Inverter 232 causes flip flop 228 to be clocked on the trailing edges 316a–316e of binary in-phase baseband signal 300. Therefore, the Q-NOT output of flip flop 228 will be high at edges 316a and 316b, but will go low at edge 316c and remain low at edges 316d–316e. Inverter 234 causes flip flop 230 to be clocked on the trailing edges 320a–320d of binary quadrature phase baseband signal 302. Therefore, the Q output of flip flop 230 will be high at edges 320a and 320b, but will go low at edge 320c and remain low at edge 320d.

Resistors 236, 240, 242, and 244 provide a means for averaging the output signals of flip flops interconnected as a voltage comparator such that a logical 1 appears at output 252 whenever the input voltage at the non-inverting input exceeds one-half the supply voltage, while a logical 0 occurs at the output when the input voltage is below one-half the supply voltage. At edge 312b, the two outputs of flip flops 224 and 226 are low while the two outputs of flip flops 228 and 230 are high, however, due to capacitor 246 the voltage at the non-inverting input of amplifier 244 does not instantaneously change to one half the supply voltage and output 252 remains in a logical 1 state. Capacitor 246 also filters out any noise that would be generated by limiters 220 and 222, and flip flops 224, 226, 228, and 230. Immediately after edge 316c, the three outputs of flip flops 224, 226, and 228 are now low while only the output of flip flop 230 is high. After a small time delay 324, capacitor 246 discharges to the point that the voltage at the non-inverting input of amplifier 238 drops below one-half the supply voltage and output 252 switches from a logical 1 to a logical 0 at edge 326.

Figure 1:
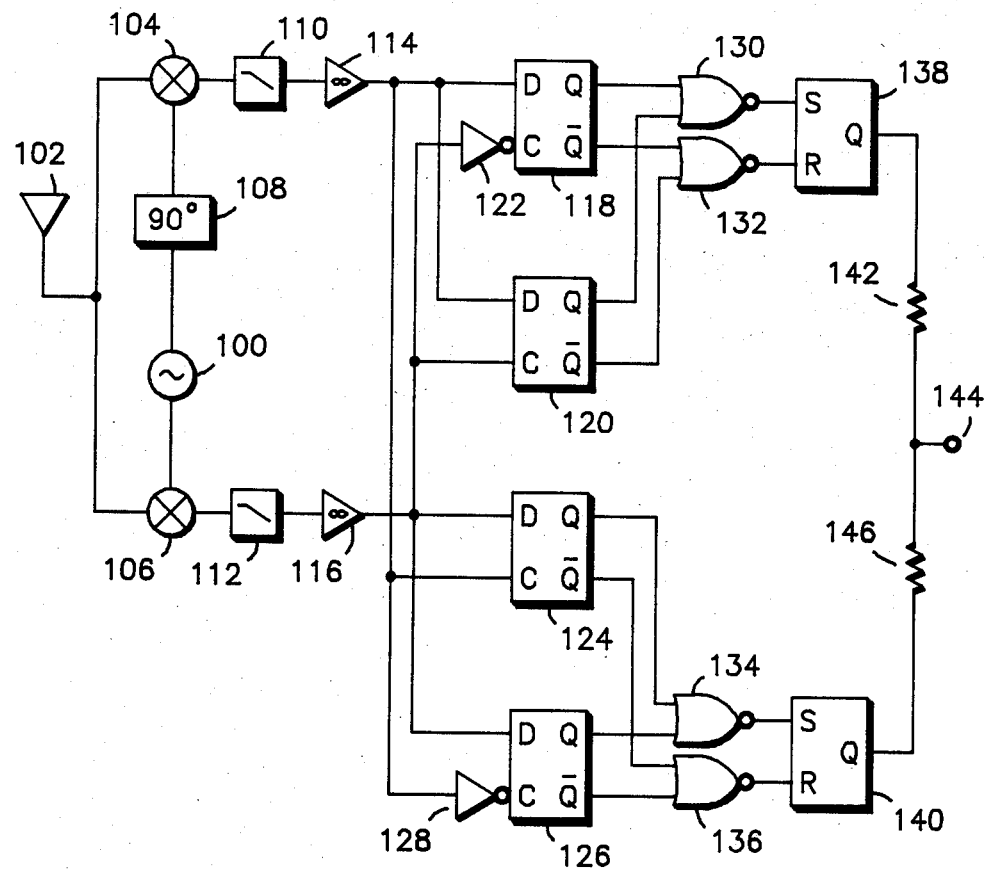
FIG. 1 is a diagram of a prior art receiver circuit.

The circuit of FIG. 2 has many advantages over the prior art. First, the output of RF amplifier 200 is typically on the order of −90 dBm, therefore, any spurious electromagnetic radiation that is radiated by coils or other components included in quadrature coupler 202 is negligible. By contrast, any spurious electromagnetic radiation emitted by phase shift network 108 of the prior art circuit of FIG. 1 is very significant because, as previously explained, the signal strength at the input to phase shift network 108 is very strong, typcially −10 dBm. This spurious electromagnetic radiation can desensitize adjacent receivers operating on the same frequency, therefore, the present invention is particularly useful in a personal paging receiver environment wherein it is quite common to find two receivers operating on the same frequency and in close proximity.

Second, the present invention shows significantly improved performance over that of the prior art. Measurements indicate that at 4 KHz deviation and a transmitter/local oscillator offset of 2.5 KHz, the performance of the present invention only degrades by 3 dB from its zero offset performance, and at 3 KHz deviation the performance only degrades by 1 dB. This improvement is due to the four resistors 236, 238, 240, and 242 which provide a means for averaging the outputs of the four flip flops 224, 226, 228, and 230. Under low signal to noise ratios, a noise error due to significant transmitter/local oscillator frequency offset, only produces a maximum quarter height error at the non-inverting input of amplifier 244. Because of the resistors and capacitor 246, three noise errors in three of the flip flops are required before a bit error occurs at output 252.

I claim:

1. A detector, for use with means for receiving, splitting, phase shifting, and mixing with a local oscillator signal a received modulated signal to produce binary in-phase and binary quadrature phase signals respectively at in-phase and quadrature phase output, said detector comprising in combination:
    first flip flop means, connected to said quadrature phase output, for clocking said quadrature phase signal on the leasing edge of said in-phase signal;
    second flip flop means, connected to said in-phase output, for clocking said in-phase signal on the leading edge of said quadrature phase signal;
    third flip flop means, connected to said quadrature phase output, for clocking said quadrature phase signal on the trailing edge of said in-phase signal;
    fourth flip flop means, connected to said in-phase output, for clocking said in-phase signal on the trailing edge of said quadrature phase signal; and
    averaging means, connected to said first, second, third, and fourth flip flop means, for averaging the output signals of said first, second, third, and fourth flip flop means.

2. The detector of claim 1, wherein said averaging means includes first, second, third, and fourth resistors, each of said resistors having one terminal respectively connected to said first, second, third, and fourth flip flop means, and the second terminals of said resistors being mutually connected.

3. The detector of claim 2, wherein said averaging means further includes a capacitor, connected to said second terminals of said resistors.

4. A receiver for detecting a received modulated signal, said receiver comprising in combination:
    means for receiving, splitting, phase shifting, and mixing with a local oscillator signal said received modulated signal to produce binary in-phase and binary quadrature phase signals, said quadrature generator means having in-phase and quadrature phase outputs;
    first and second flip flops, each having an input connected to said in-phase output and each having a clock input connected to said quadrature phase output, wherein said first flip flop is leading edge triggered and said second flip flop is trailing edge triggered;
    third and fourth flip flops, each having an input connected to said quadrature phase output and each having a clock input connected to said in-phase output, wherein said third flip flop is leading edge triggered and said fourth flip flop is trailing edge triggered;
    first, second, third, and fourth resistors, each of said resistors having one terminal respectively connected to an output of said first, second, third, and fourth flip flops, and the second terminals of said resistors being mutually connected; and
    a capacitor connected to the mutually connected terminals of said resistors.

5. The receiver of claim 4, further comprising a comparator, connected to the mutually connected terminals of said resistors.

6. The receiver of claim 4, wherein said quadrature generator means includes a quadrature coupler having an input for receiving said received signal.

7. A receiver for detecting a received signal, said receiver comprising in combination:
    a quadrature coupler having an input, wherein said received signal is coupled to said input of said quadrature coupler;
    a cascaded first mixer, first filter, and first limiter, said first mixer having an input connected to the in-phase output of said quadrature coupler;
    a cascaded second mixer, second filter, and second limiter, said second mixer having an input connected to the quadrature phase output of said quadrature coupler;
    first and second D flip flops, each having a D input connected to said first limiter and each having a clock input connected to said second limiter, wherein said first D flip flop is leading edge triggered and said second D flip flop is trailing edge triggered;
    third and fourth D flip flops, each having a D input connected to said second limiter and each having a clock input connected to said first limiter, wherein said third D flip flop is leading edge triggered and said fourth D flip flop is trailing edge triggered;
    a voltage comparator;
    a capacitor connector to an input of said voltage comparator;
    first, second, third, and fourth resistors each having one terminal respectively connected to the Q-NOT output of said first D flip flop, the Q output of said second D flip flop, the Q output of said third D flip flop, and the Q-NOT output of said fourth D flip flop, the second terminals of said resistors being connected to said input of said voltage comparator.

* * * * *